United States Patent [19]

Lebby et al.

[11] Patent Number: 5,467,215

[45] Date of Patent: Nov. 14, 1995

[54] INTEGRATED ELECTRO-OPTIC PACKAGE FOR REFLECTIVE SPATIAL LIGHT MODULATORS

[75] Inventors: Michael S. Lebby, Apache Junction; George R. Kelly, Gilbert; Karen E. Jachimowicz, Laveen, all of Ariz.

[73] Assignee: Motorola, Schaumburg, Ill.

[21] Appl. No.: 360,510

[22] Filed: Dec. 21, 1994

[51] Int. Cl.⁶ .................................................. G02F 1/133
[52] U.S. Cl. ............................ 359/247; 359/62; 359/83
[58] Field of Search .................................... 359/247, 263, 359/252, 253, 53, 54, 55, 62, 83, 69, 70

[56] References Cited

U.S. PATENT DOCUMENTS

| | | |
|---|---|---|
| 4,514,042 | 4/1985 | Nukii et al. .................... 350/331 R |
| 4,690,510 | 9/1987 | Takamatsu et al. .................... 350/334 |
| 5,293,262 | 3/1994 | Adachi et al. .................... 359/88 |
| 5,406,399 | 4/1995 | Koike .................... 359/83 |

*Primary Examiner*—Mark Hellner
*Attorney, Agent, or Firm*—Eugene A. Parsons

[57] ABSTRACT

An array of reflective LCSLM pixels formed on a substrate with a light polarizing layer positioned in overlying relationship to the array. A light source mounted in an optically clear support positioned in overlying relationship to and spaced from the array, so that light evenly illuminates the array through the support and allows passage of reflected light from the array back through the support. Electrical connections are made from the array, through leads in the support and to external contacts. A diffuser mounted in overlying and spaced relationship to the support to form an image plane for reflected light from the array.

25 Claims, 4 Drawing Sheets

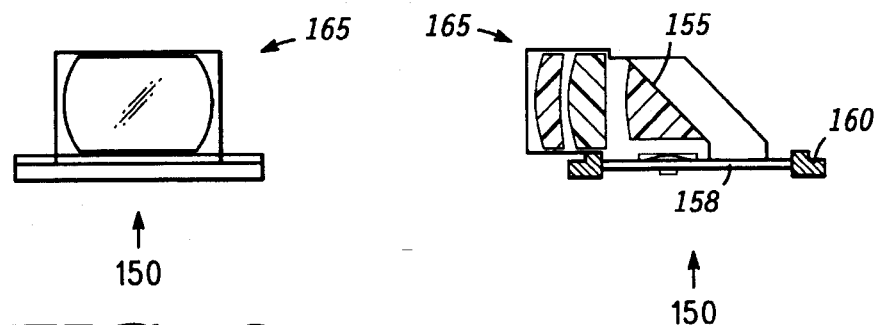
FIG. 6
FIG. 7
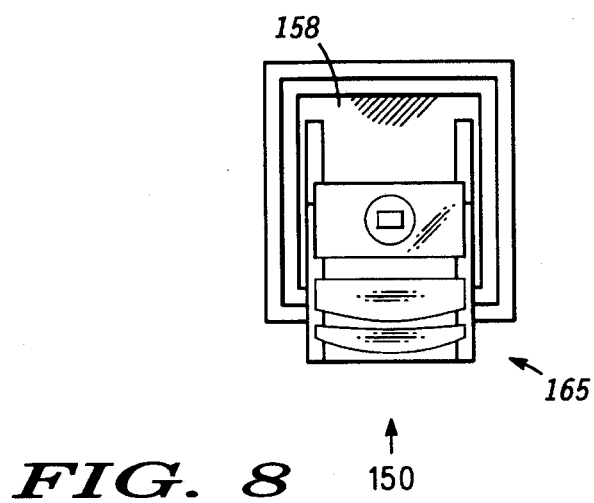
FIG. 8
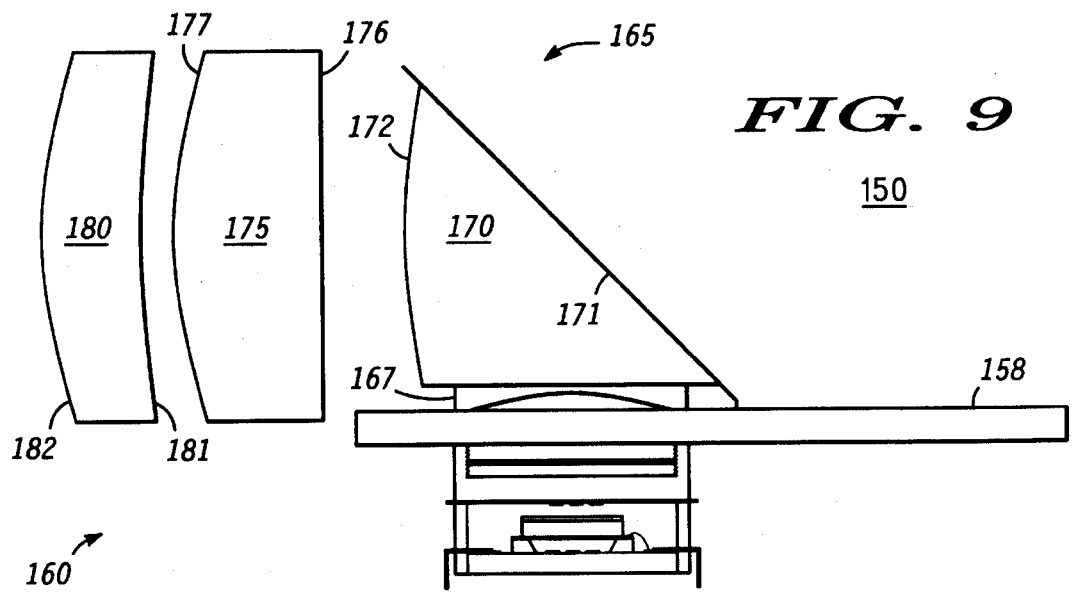
FIG. 9

INTEGRATED ELECTRO-OPTIC PACKAGE FOR REFLECTIVE SPATIAL LIGHT MODULATORS

FIELD OF THE INVENTION

The present invention pertains to reflective spatial light modulators and more specifically to packaging and illumination of reflective spatial light modulator devices.

BACKGROUND OF THE INVENTION

Liquid crystal spatial light modulators (LCSLMs) are very popular at the present time and are utilized in a great variety of direct view type displays, such as digital watches, telephones, lap-top computers and the like. In general, liquid crystal devices are illuminated with a relatively large, separately mounted light source, preferably from the rear (backlighting), so that most of the light travels directly through the liquid crystal and outwardly to the eye of a viewer. Direct view displays require a substantial amount of light for suitable viewing, generally about 25 fL to be visible in office environments and more than 100 fL to be visible in an outdoor environment. To provide this amount of light or luminance at the outlets of the LCSLMs requires a relatively bright, and large, light source.

Further, LCSLMs used in display applications require polarized light and a diffuser placed in the optical path. Light entering the LCSLMs must be polarized, and an analyzing polarizer must be placed in the path of exiting light to differentiate between which LCSLM pixels are ON and which are OFF. A diffuse element, either near the modulating LCSLM or as a screen in a projection system, must be used. Generally, the result is to produce a relatively large and cumbersome package, usually with several discrete components.

This problem severely limits the usefulness of liquid crystal displays. For example, in portable electronic devices such as telephones, two-way radios, pagers, etc. the displays are limited to a few alpha-numeric digits. Generally, if a small portable device is desired, the display must be reduced to a very small number of digits, since the size of the display dictates the minimum size of the device into which it is integrated.

One way to alleviate package size problems is to use a very small liquid crystal spatial light modulator (LCSLM) as the image source, with a magnifying optical system. This can take the form of a projection display, in which light modulated by the liquid crystal is projected by the optical system onto a diffusing screen, or it can take the form of a virtual display, where the optical system creates a large virtual image of the small real image created by the LCSLM.

By using the LCSLM in a reflective mode, a reflective LCSLM is formed, which can be built onto a silicon substrate that contains the drive circuitry and other related electronics. When using this configuration as a virtual image display, the number of discrete components still results in a large and cumbersome package. At present, it is extremely difficult to provide a sufficiently large light source, and to mount the light source and the polarizers so that the reflective LCSLM is properly illuminated and can be viewed conveniently.

Thus, it would be beneficial to have reflective LCSLMs with improved packaging and lighting so they would be more versatile.

It is a purpose of the present invention to provide new and improved integrated electro-optic packaging for reflective spatial light modulators.

It is another purpose of the present invention to provide new and improved integrated electro-optic packaging for reflective spatial light modulators utilizing improved light sources.

It is still another purpose of the present invention to provide new and improved integrated electro-optic packaging for reflective spatial light modulators which are useful in forming a virtual image.

It is a further purpose of the present invention to provide new and improved integrated electro-optic packaging for reflective spatial light modulators which is small and compact enough to be utilized in portable electronic equipment.

It is a still further purpose of the present invention to provide new and improved integrated electro-optic packaging for reflective spatial light modulators which requires a sufficiently small amount of power to be utilized in portable electronic equipment.

It is yet another purpose of the present invention to provide new and improved integrated electro-optic packaging for reflective spatial light modulators which includes molded components that are easily and inexpensively fabricated and assembled.

SUMMARY OF THE INVENTION

The above described problems and others are at least partially solved and the above purposes and others are realized in an integrated electro-optic package for reflective spatial light modulators including an array of reflective spatial light modulator pixels formed on a substrate with each pixel including a control circuit formed in the substrate, each control circuit including control terminals adjacent an outer edge of the substrate, a mirror positioned on the substrate in overlying relationship to the control circuit, and a layer of light modulating material positioned in overlying relationship to the mirror so that light passing through the light modulating material is reflected back through the light modulating material.

The package further includes a light polarizing layer positioned in overlying relationship to the array of reflective spatial light modulator pixels. An optically clear support is positioned to retain the array and the light polarizing layer and to provide electrical connections to the array.

A light source is mounted in the optically clear support and positioned in overlying relationship to the array with the light source spaced from the array, so that light from the light source passes through the polarizing layer, substantially evenly illuminates the array and allows passage of reflected light from the array through the polarizing layer and the optically clear support.

A diffuser is mounted in overlying and spaced relationship to the optically clear support to form an image plane for reflected light from the array of reflective spatial light modulator pixels which has passed through the polarizing layer and the optically clear support.

The above described problems and others are at least partially solved and the above purposes and others are further realized in a method of fabricating an integrated electro-optic package for reflective spatial light modulators including providing an optically clear support by some convenient method, such as molding or the like. The optically clear support includes a light source, a polarizing layer and a diffuser to provide an image, as well as electrical leads positioned to connect to the reflective spatial light modulators and provide an external electrical connection thereto.

BRIEF DESCRIPTION OF THE DRAWINGS

Referring to the drawings:

FIGS. 6, 7 and 8 illustrate a front view, side elevational view, and top plan, respectively, of image manifestation apparatus utilizing the integrated electro-optic package illustrated in FIG. 3; and FIG. 9 is a 4× magnified view in side elevation of the apparatus of FIG. 8.

DESCRIPTION OF THE PREFERRED EMBODIMENTS

Figure 1:
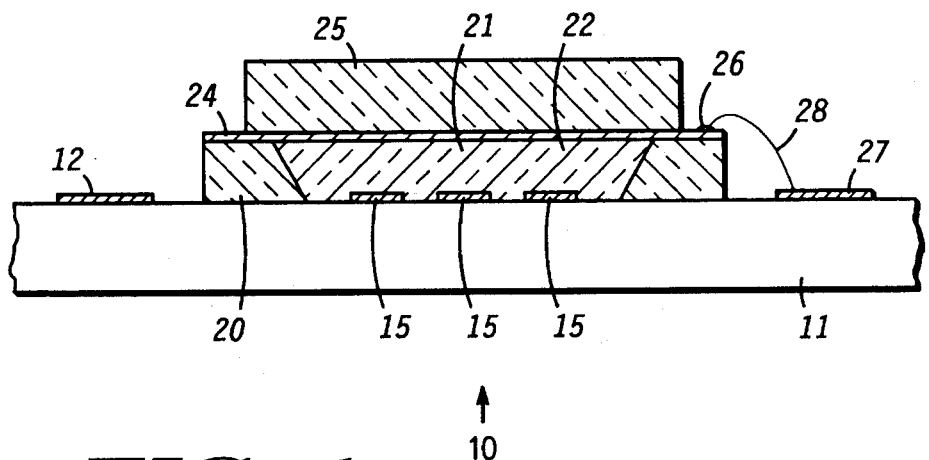
FIG. 1 is a simplified and enlarged sectional view of a reflective liquid crystal spatial light modulator stack.

Referring specifically to FIG. 1, a simplified and enlarged sectional view of a reflective liquid crystal spatial light modulator (LCSLM) stack 10 is illustrated. Stack 10 includes a substrate 11 formed of any convenient semiconductor material, such as silicon, silicon carbide, gallium arsenide, etc. in which integrated electronic circuits can be formed. As will be explained in more detail presently, the integrated electronic circuits include one driver circuit and associated addressing and switching circuitry for each LCSLM pixel formed in stack 10. A plurality of bond or terminal pads 12 are formed adjacent the edges of substrate 11 and are in electrical communication with the integrated electronic circuits so that individual addressing of the electronic circuits is possible.

A two dimensional array of reflective metal pads 15 are formed on the upper surface of substrate 11, which metal pads 15 each define a reflective LCSLM. In the present embodiment, metal pads 15 are made of aluminum or any metal that can be conveniently patterned on the surface of substrate 11 and which will reflect light impinging thereon. Each metal pad of the plurality of metal pads 15 is electrically connected to a driver circuit and addressing and switching circuitry so as to form one contact for activating the liquid crystal material in the space above metal pad 15, forming a pixel.

In this embodiment, metal pads are formed in rows and columns and the addressing and switching circuitry (not shown) includes row and column electrical buses and electronic switches coupled to metal pads 15 so that each metal pad 15 can be individually addressed. The row and column electrical buses are electrically connected to the plurality of bond or terminal pads 12 formed adjacent the edges of substrate 11 for external communication (addressing and controlling) with individual metal pads 15. Further, it should be noted that metal pads 15 along with any driving, addressing and switching circuitry is formed in substrate 11 and coupled to the plurality of bond or terminal pads 12 with pixels defined and formed thereabove.

A generally tubular glass spacer 20 is fixedly attached to the upper surface of substrate 11 by any convenient means, such as adhesive, chemical bonding, growing and etching layers, etc. It will of course be understood that spacer 20 could be formed in a variety of other embodiments and the present structure is illustrated only for purposes of this explanation. Spacer 20 has an inner opening 21 defined therethrough with sufficient size to encircle the two dimensional array of reflective metal pads 15. The cavity formed by opening 21 in spacer 20 in conjunction with the upper surface of substrate 11 is filled with liquid crystal material 22. Typical examples of liquid crystal material which can be used for this purpose are disclosed in U.S. Pat. No. 4,695,650, entitled "Liquid Crystal Compounds and Compositions Containing Same" issued Sep. 22, 1987 and U.S. Pat. No. 4,835,295, entitled "Ferroelectric Liquid Crystal Compounds and Compositions", issued May 30, 1989.

A glass window 25 has a layer 24 of transparent electrically conductive material, such as indium-tin-oxide (ITO) or the like, formed thereon to define a second contact, which, in conjunction with metal pads 15 and liquid crystal material 22 form a complete two dimensional array of LCSLMs. Glass window 25 is fixedly attached to the upper surface of glass spacer 20 so that electrically conductive material layer 24 on the lower surface thereof is in contact with liquid material 22 and liquid material 22 is contained within the cavity defined by the upper surface of substrate 11, inner opening of spacer 20 and glass window 25. It will be apparent to those skilled in the art that electrically conductive material layer 24 can be formed in a separate or discrete layer that is simply positioned on glass spacer 20 and partially sandwiched therebetween during assembly.

Electrically conductive material layer 24 is a common second electrical connection for each pixel defined by metal pads 15 and is connected by a conductive lead to a bond pad 26 adjacent the outer edges of glass spacer 20. Bond pad 26 is then electrically connected to a bond pad 27 on substrate 11 by any convenient means, such as wire bond 28, a feed through connector in the edges of glass spacer 20 (not shown), etc. Bond pad 27 is adapted to have applied thereto a common potential, such as ground or some fixed voltage, which in cooperation with various potentials applied to metal pads 15 turn ON, turn OFF, and reset (if necessary) each LCSLM in each pixel.

It will be understood that various liquid crystal and ferroelectric liquid crystal material can be provided which will operate in different modes in response to different signals or potentials applied thereto. Reflective LCSLMs can be provided, for example, that: rotate the polarization of light impinging thereon when a predetermined potential is applied thereacross and do not rotate the polarization when the potential is removed; rotate the polarization of light impinging thereon when no potential is applied thereacross and do not rotate the polarization when a predetermined potential is applied; rotate the polarization of light impinging thereon when a first predetermined potential is applied thereacross and do not rotate the polarization when a second (lower or higher) potential is applied; etc. Further, common nematic liquid crystal spatial light modulators do not have a memory and do not have to be reset after each application of a potential, but ferroelectric liquid crystal material has a memory and, at least in some applications, ferroelectric liquid crystal spatial light modulators may require a reset (or other modifying) signal between normal switching signals. Generally, the term "activate" or "activated" will be used to indicate that a signal or signals are being applied to or removed from a pixel to cause the pixel to change, regardless of the mode of operation, so as to produce a desired result, which desired result will be apparent.

Glass window 25 completes reflective LCSLM stack 10 which includes a two dimensional array of reflective liquid crystal pixel elements, each of which are individually addressable through bond pads 12. To turn a pixel ON a potential must be applied between the upper and lower contacts for that specific pixel. With no potential applied, the pixel is normally in an OFF condition. Glass plate 25 defines a light input and light output for each of the pixels in the two dimensional array of reflective LCSLMs. While the present embodiment is explained using liquid crystal material in the pixels, it should be understood that other types of spatial light modulators might be utilized in the pixels, including, for example, other types of light modulating liquid or solid material, mirrors or other reflective material, etc.

Figure 2:
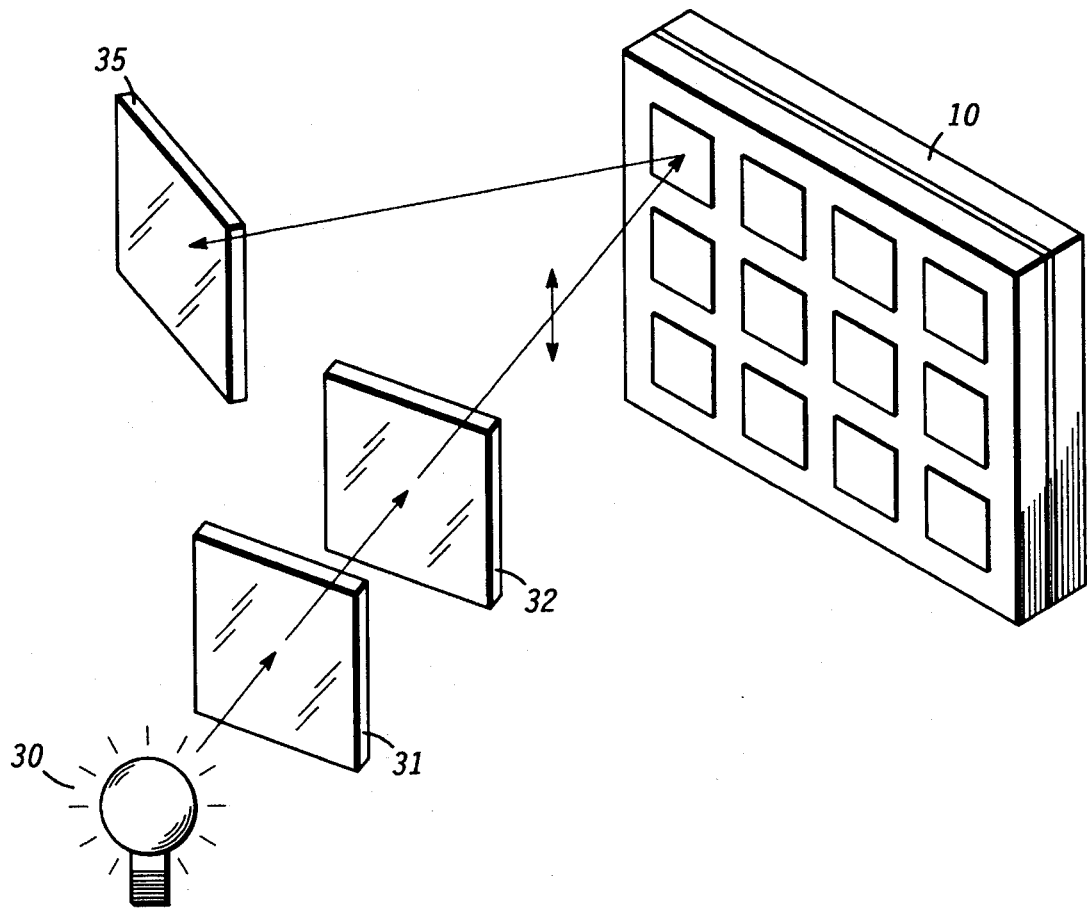
FIG. 2 is a semi-schematic perspective view for illustrating the operation of the reflective liquid crystal spatial light modulator stack.

Referring now to FIG. 2, the operation of reflective LCSLM stack 10 is briefly explained. A light source 30 is provided, which may be any light emitting device capable of providing sufficient light for the operation explained. Light from source 30 is diffused in a plate 31 and polarized in a second plate 32 before illuminating stack 10. Diffusing plate 31 is provided to spread the light from source 30 over stack 10. Polarizing plate 32 polarizes the light into a vertical polarization, for example, prior to the light impinging on stack 10.

The liquid crystal, for example ferroelectric liquid crystal material, in stack 10 rotates the polarization of light passing therethrough when in the activated condition (this operating mode is used only for purposes of this explanation), just as in a standard twisted nematic liquid crystal display. Thus, light passing through glass plate 25 and liquid crystal material 22 and reflected from pads 15 back through liquid crystal material 22 and glass plate 25 gets a 90° polarization rotation in each pixel that is activated. For all pixels in the array that are not activated the light passing therethrough is not changed in polarization.

An analyzing polarization plate 35 is positioned so that light reflected through the plurality of pixels in the array of stack 10 passes therethrough. If, for example, plate 35 is polarized horizontally all light reflected from pixels that are activated, which light is rotated 90° in polarization, will pass through plate 35, while light reflected from pixels which are not activated and which is not rotated in polarization will be blocked. If plate 35 is vertically polarized, the same as plate 32, light from pixels which are not activated will pass therethrough and light from pixels which are activated will be blocked. It will be understood that pixels which are constructed to operate in any other mode, such as those described above, may require different orientation of plates 32 and 35.

Figure 3:
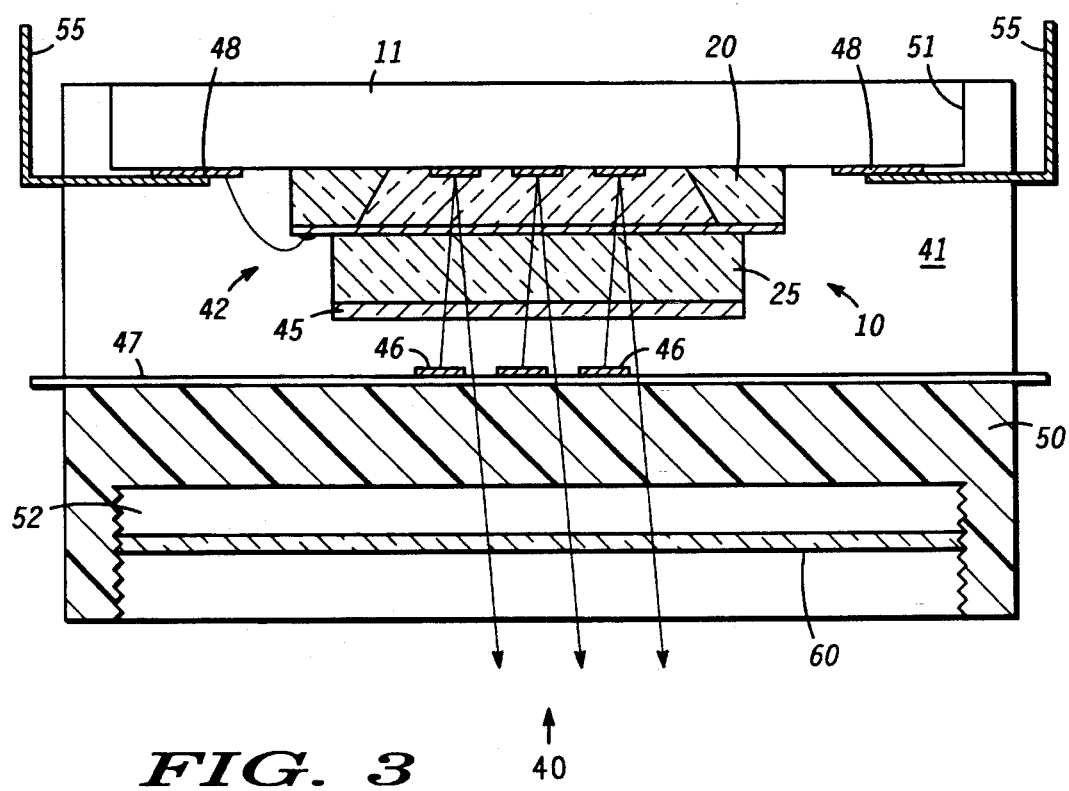
FIG. 3 is a sectional view of an integrated electro-optic package, including a reflective liquid crystal spatial light modulators stack, embodying the present invention.

Referring now to FIG. 3, an enlarged sectional view of an integrated electro-optic package 40 embodying the present invention is illustrated. Package 40 includes reflective LCSLM stack 10, which is illustrated in an even more simplified form for convenience. An optically clear support 41 having a cavity 42 formed therein is fabricated by any convenient means, such as molding, etching, or the like. As an example of a preferred embodiment, support 41 is molded using any convenient optically clear plastic, such as optically clear liquid epoxy available under a Tradename EPO-TEK 301-2 from EPOXY TECHNOLOGY INC. or a clear epoxy molding compound available under the Tradename HYSOL MG18 from Dexter Corporation. In the preferred embodiment, support 41 is formed of plastic with a relatively low coefficient of expansion (e.g. 20 ppm or less) so that support 41, substrate 11, glass spacer 20 and glass window 25 all have a temperature coefficient of expansion within a range that allows reasonable temperature cycling of the structure without causing critical or damaging stresses.

Cavity 42 is formed so that stack 10 can be nestingly positioned therein with glass window 25 resting near the lower surface of cavity 42. A polarizing plate 45 is positioned in cavity 42 between the lower surface thereof and glass plate 25 so that all light entering or exiting glass plate 25 passes through and is polarized by polarizing plate 45. It will of course be understood that polarizing plate 45 can be a separate, discrete plate positioned in cavity 42 before inserting stack 10, or polarizing plate 45 can be deposited on the surface of glass plate 25 or on the lower surface of cavity 42.

One or more light sources 46 are positioned on the lower surface of support 41 opposite polarizing plate 45. Light sources 46 can include a single light emitting diode (LED) or several diodes positioned so as to substantially uniformly illuminate stack 10. For example, currently known GaN LEDs are capable of producing output power of approximately 40 mA and 2 mW, which translates into an output power of approximately 11 lumens/watt. While the GaN LEDs are only capable of producing blue to blue/green light at the present time, other LEDs are available for producing other colors, e.g. GaP for green, AlGaAs for producing red or InGaP for producing red, etc. In this embodiment, for example, three LEDs (a red, a green and a blue LED) are provided in optically clear support 41 and are alternately activated to form three different light sources 46, each of which fully and uniformly illuminates stack 10 at different times. By activating each LCSLM (pixel) in stack 10 in accordance with the amount of each color (red, green, or blue) required in each pixel during the time that that color LED is activated, a complete and full color image is produced for each cycle of the three LEDs. It will of course be understood that more than one LED of each color can be utilized if more than one is required to provide full and uniform illumination.

In this specific embodiment, light sources 46 are embedded in optically clear support 41 during the molding process and a patterned transparent conductive layer 47, patterned electrical leads, or imbedded electrical leads are provided on the lower surface of optically clear support 41 to provide electrical connections to light sources 46. Layer 47 extends outwardly to the edges of optically clear support 41 where it acts as external electrical contacts for light sources 46. Also, a plurality of generally L-shaped leads 48 are formed in support 41 so as to electrically engage bond pads 12 and 27 of substrate 11 at one end thereof and so that the other end extends to an outer surface of support 41 and forms external electrical terminals for the driver circuits and the switching and address circuitry formed in substrate 11.

A housing 50 is provided which includes an upper cavity 51 and a lower cavity 52. Housing 50 is formed of optically clear material, such as plastic, and in this preferred embodiment is molded by some convenient process, such as injection or thermal set molding. For example, housing 50 is molded using any convenient optically clear plastic, such as optically clear liquid epoxy available under a Tradename EPO-TEK 301-2 from EPOXY TECHNOLOGY INC. or a clear epoxy molding compound available under the Tradename HYSOL MG18 from Dexter Corporation. In the preferred embodiment, housing 50 is formed of a plastic with an index of refraction which substantially matches the index of refraction of support 41 and a coefficient of expansion (e.g. 20 ppm or less) which also matches that of support 41.

Upper cavity 51 of housing 50 is formed to nestingly receive optically clear support 41 therein with the lower surface of support 41 in abutting engagement with a lower surface of cavity 51. A plurality of external leads 55 are molded into housing 50 so as to extend into cavity 51 and electrically engage the external terminal ends of leads 48 and to extend outwardly beyond the outer surface of housing 50 and form mounting and/or external electrical connections for integrated electro-optic package 40. Leads 48 and leads 55 can be formed initially as lead frames and molded into support 41 and housing 50, respectively.

Lower cavity 52 is formed to receive a diffuser 60 therein, which diffuser 60 forms an image plane for light emitted from stack 10. Also, some additional optical elements may be positioned in lower cavity 52 between the inner surface of cavity 52 and diffuser 60, especially if the distance between diffuser 60 and polarizing plate 45 is great enough to allow too much spreading of the reflected light. Such additional optical elements can provide additional magnification and/or partial collimation prior to the light impinging upon diffuser 60.

Generally, diffuser 60 is formed as an optical lens which is removeably and/or adjustably mounted in cavity 52. In the present specific embodiment, diffuser 60 is formed in the shape of a disk with external threads on the outer periphery thereof, which threads are threadidly engaged in internal threads on the inner surface of cavity 52. Thus, diffuser 60 can be easily and quickly moved axially relative to stack 10 to provide focusing of the image formed on diffuser 60. It should be understood that the diffusion required to produce a real image from the light reflected by the array of LCSLMs can be provided by a diffusion element positioned between polarizing plate 45 and light source 46 (not shown), or, in some applications, by a diffusion material positioned on the surfaces of metal plates 15, or some combination of the above.

Lower cavity 52 may be further formed to receive, after receiving diffuser 60, single or multiple optical elements therein, such as refractive or diffractive lenses, diffusers, filters, etc. The additional optical elements can be formed separately from diffuser 60 or as a single unit with diffuser 60. Also, it will be understood that diffuser 60 and/or extra optical elements can be mounted in lower cavity 52 by threaded engagement (as illustrated) or by any other convenient means, such as "snap-in" or frictional engagement.

Thus, a new and improved integrated electro-optic package for reflective SLMs is disclosed which is relatively easy and inexpensive to manufacture. The package ruggedly mounts the various optical components while conveniently integrating electrical connections to the components and providing external connections thereto. Further, light sources, polarizers and a diffuser are conveniently integrated into a small compact package which is easily integrated into portable electronic equipment. By using LEDs for the light source, the size of the package is further reduced and the electrical power required is also minimized. Also, by using multicolored LEDs images with partial or full color can be formed.

Figure 4:
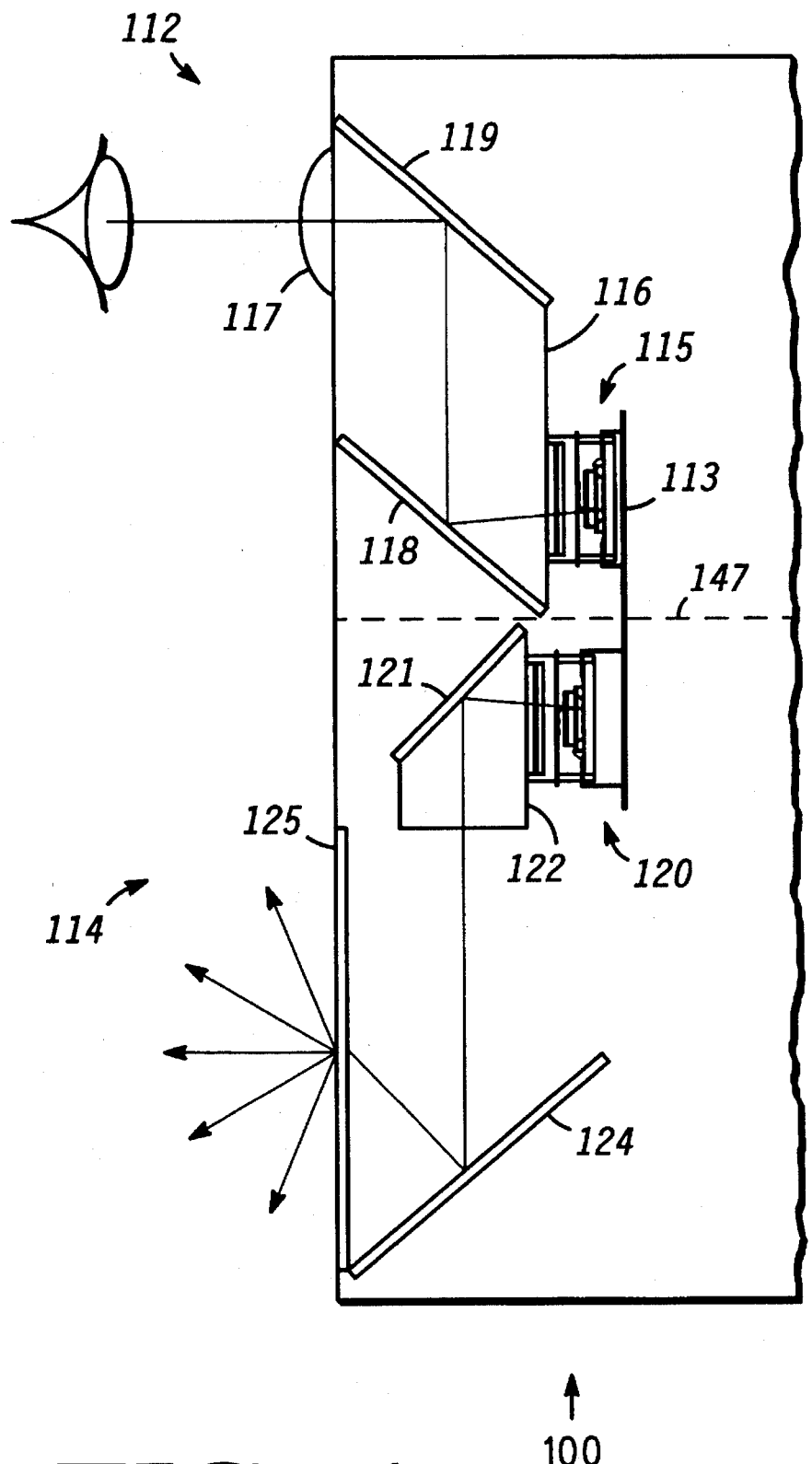
FIG. 4 is a simplified schematic view generally illustrating dual image manifestation apparatus utilizing two of the integrated electro-optic packages illustrated in FIG. 3.

Two different possible applications for integrated electro-optic package 40 are incorporated into a portable electronic device including dual image manifestation apparatus 100, a simplified schematic view of which is illustrated in FIG. 4. Dual image manifestation apparatus 100 includes first image manifestation apparatus 112 constructed to provide a large virtual image and second image manifestation apparatus 114 constructed to provide a direct view image. Apparatus 112 includes a real image generator 115 affixed in overlying relationship to an optical input of an optical waveguide 116. An optical output of optical waveguide 116 is positioned to be externally available and has a lens system, represented by a single lens 117, affixed thereover.

Image generator 115 includes, for example, integrated electro-optic package 40 (as illustrated in FIG. 3) mounted on a printed circuit board 113 and driven by data processing circuits (not shown), also mounted on printed circuit board 113. The data processing circuits include, for example, logic and switching circuit arrays for controlling each pixel in the SLM array of image generator 115. The data processing circuits include, in addition to or instead of the logic and switching arrays, a microprocessor or similar circuitry for processing input signals to produce a desired real image on the diffuser of image generator 115.

In this specific embodiment the pixels are formed in a regular, addressable pattern of rows and columns and, by addressing specific pixels by row and column in a well known manner, the specific pixels are activated to produce a real image on the diffuser. Digital or analog data is received at an input terminal and converted by data processing circuits into signals capable of activating selected LCDs to generate the predetermined real image.

As the technology reduces the size of package 115, greater magnification and smaller lens systems are required. Reducing the size of the lenses while increasing the magnification results in greatly limiting the field of view, substantially reducing eye relief and reducing the working distance of the lens system. Generally, optical waveguide 116 includes one or more optical elements 118 and 119, which may be Fresnel lenses, reflective elements, refractive elements, diffractive elements, etc. Elements 118 and 119 may provide some magnification and/or may reduce various types of distortion. Lens system 117 is mounted so as to receive the image from optical waveguide 116, magnify it an additional predetermined amount and create an aperture within which a virtual image is viewed. In the present embodiment, optical waveguide 116 and lens system 117 magnify the image a total of approximately twenty times. Generally, a magnification greater than ten (10×) is required to magnify the real image generated by image generator 115 sufficiently to be perceived by a human eye.

It will of course be understood that lens system 117 may be adjustable for focus and additional magnification, if desired, or may be fixed in a housing for simplicity. Because the image received by lens system 117 from optical waveguide 116 is much larger than the image at image generator 115, lens system 117 may not be required to provide the entire magnification and, therefore, is constructed larger and with less magnification. Because of this larger size, the lens system has a larger field of view and a greater working distance, which in turn provides better eye relief.

Here it should be understood that the virtual image viewed by the operator through lens system 117 is relatively large (e.g. 8.5"×11") and appears to the operator to be several feet behind dual image manifestation apparatus 100. Because of the size of the virtual image produced by image manifestation apparatus 112, a large variety of alphanumeric and/or graphic images can be easily and conveniently viewed. Further, image manifestation apparatus 112 is very small and compact so that it can easily be incorporated into portable electronic devices, such as pagers, two-way radios, cellular telephones, data banks, etc., without substantially effecting the size or power requirements.

Second image manifestation apparatus 114 constructed to provide a direct view image includes an image generator 120, which includes integrated electro-optic package 40 (as illustrated in FIG. 3) similar to image generator 115, an optical waveguide 122 an optical element 124 and a direct view screen 125. Optical waveguide 122 may image the output of image generator 120 onto screen 125. Image generator 120 is mounted in overlying relationship on an optical input to optical waveguide 122. The image from image generator 120 is reflected and/or otherwise directed by an optical element 121 onto optical element 124. While element 124 is illustrated as a separate element, it will be understood that it could be incorporated as a portion of optical waveguide 122. Optical element 124 can also include a Fresnel lens, or the like, for focusing and/or magnification if desired. The image from optical element 124 is directed onto screen 125 where it can be directly viewed by the operator.

Image manifestation apparatus 114 provides a direct view image which can be no larger than screen 125 upon which it is projected. Because of the much smaller size of the direct view image, the amount of magnification required is much smaller, i.e. less than approximately 10×. Generally, while the direct view image is much smaller than the virtual image produced by image manifestation apparatus 112, more light (larger light source) is required to generate the direct view image because more light is required to project the image onto screen 125. However, because the direct view image is smaller, any message contained in the direct view image must be larger in order to be perceived by the operator. Thus, whereas one pixel in the array of image generator 115 produces one pixel in the final virtual image (for example), several pixels in the array of image generator 120 operate in conjunction to produce one pixel in the direct view image on screen 125. Because several pixels produce one pixel, in many instances the higher light requirement may be automatically resolved. If additional light is required in some applications, additional LEDs (described above) or higher current and correspondingly higher light output may be utilized as the light source, as one example.

Figure 5:
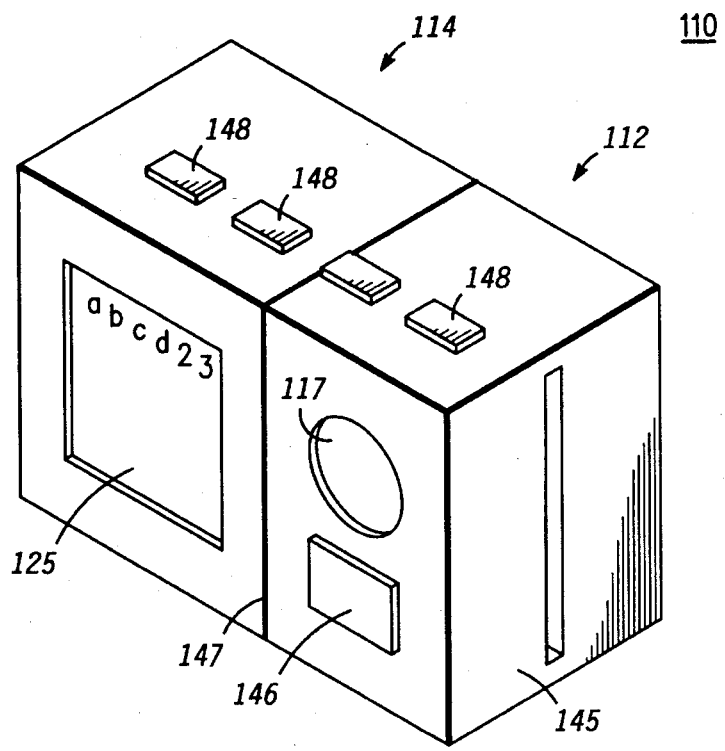
FIG. 5 is a perspective view of the dual image manifestation apparatus illustrated in FIG. 4.

Referring specifically to FIG. 5, a perspective view of dual image manifestation apparatus 100 in a portable electronic device is illustrated in a typical housing 145. Screen 125 is visible through an opening in the front of housing 145 for the direct viewing of images thereon. Also, an aperture is provided in the front of housing 145 to receive lens system 117 so that the virtual image produced by image manifestation apparatus 112 may be readily viewed. A touch pad 146 is optionally provided on the front surface of housing 145 for controlling a cursor in the virtual image, which cursor may further control displayed keyboards and/or other controls. Additional controls 148 are provided on an upper surface of housing 145 and generally include such features as an on/off switch, and controls for any electronic devices connected thereto.

Video from a receiver or other data source within the portable electronic device is communicated to either or both image manifestation apparatus 112 and 114 for convenient viewing by the operator. Generally, for example, control signals titles, etc. may appear in the direct view image on screen 125 while larger alpha-numeric messages and graphics will appear in the virtual image at lens system 117. Also, in some applications, it is envisioned that dual image manifestation apparatus 100 may be constructed so that image manifestation apparatus 112 can be physically separated from image manifestation apparatus 114, along line 147 for example, and each can be used separately. In such an embodiment image manifestation apparatus 112 is a very low power device while image manifestation apparatus 114 generally requires more power and will, for example, generally contain the portable electronic equipment (e.g. a communication receiver).

FIGS. 6, 7 and 8 illustrate a front view, side elevational view, and top plan, respectively, of another miniature virtual image display 150 in accordance with the present invention. FIGS. 6, 7 and 8 illustrate miniature virtual image display approximately the actual size to provide some indication as to the extent of the reduction in size achieved by the present invention. Display 150 includes an integrated electro-optic package 155 which includes, in this specific embodiment, 144 pixels by 240 pixels. Each pixel is fabricated approximately 20 microns on a side with a center-to-center spacing between adjacent diodes of no more than 20 microns. In a preferred embodiment, integrated electro-optic package 155 produces a luminance less than approximately 15 fL. This very low luminance is possible because display 150 produces a virtual image. Further, because a very low luminance is required, LEDs and the like may be utilized as the light source for the SLM stack, which greatly reduces the size and power requirements. Integrated electro-optic package 155 is mounted on the surface of a driver board 158. An optical system 165 is also mounted on driver board 158 and magnifies the image approximately 20× to produce a virtual image approximately the size of an 8.5"×11" sheet of paper.

Here it should be noted that because of the very small integrated electro-optic package 155 and the fact that a virtual image is utilized, rather than a direct view display, the overall physical dimensions of miniature virtual image display 150 are approximately 1.5 inches (3.8 cm) wide by 0.75 inches (1.8 cm) high by 1.75 inches (4.6 cm) deep, or a total volume of approximately 2 cubic inches (32 cm$^3$).

Referring specifically to FIG. 9, a 4× magnified view in side elevation of miniature virtual image display 150 of FIG. 8 is illustrated for clarity. From this view it can be seen that a first optical lens 167 is affixed directly to housing 50 (see FIG. 3). An optical prism 170 is mounted to reflect the image from a surface 171 and from there through a refractive surface 172. The image is then directed to an optical lens 175 having a refractive inlet surface 176 and a refractive outlet surface 177. From lens 175 the image is directed to an optical lens 180 having an inlet refractive surface 181 and an outlet refractive surface 182. Also, in this embodiment at least one diffractive optical element is provided on one of the surfaces, e.g. surface 171 and/or surface 176, to correct for aberration and the like. The operator looks into surface 182 of lens 180 and sees a large, easily discernible virtual image which appears to be behind display 150.

It should be noted that in the prior art, pagers and other small receivers in which visual displays are desired are especially handicapped by the size of the displays. Generally such displays are limited to a single short line of text or several digits, and the size of the display still dictates the size of the receiver. Utilizing an embodiment of the present invention, a display with several lines of text to a full page can be incorporated and the size of the receiver or other portable electronic equipment can be substantially reduced. Further, the display is clearer and easier to read and, because it utilizes a virtual display, requires very little power for the operation thereof. In fact, the present display uses much less power than any of the direct view displays normally utilized in electronic equipment and, as a result, can be fabricated in much smaller sizes.

Thus a greatly improved portable electronic device with miniature virtual image display is disclosed, which incorporates an extremely small spatial light modulator array on a semiconductor chip. Because a virtual image display is utilized, the display is constructed very small and requires very little power. Further, because of the extremely small size and power consumption of the virtual image display, it is incorporated into portable electronic equipment without substantially effecting the size or power requirements. The miniature virtual display provides a predetermined amount of magnification along with sufficient eye relief and lens working distance to create a comfortable and viewable virtual image. Also, a complete virtual image is produced with no moving parts or power consuming motors and the like. Further, the electronics provided as a portion of the miniature virtual image display allows a variety of very small real images to be generated. The very small real image is magnified into a large virtual image that is easily perceived by the operator.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An integrated electro-optic package for reflective spatial light modulators comprising:

an array of reflective spatial light modulator pixels formed on a substrate with each pixel including a control circuit formed in the substrate, each control circuit including control terminals adjacent an outer edge of the substrate, a mirror positioned on the substrate in overlying relationship to the control circuit, and spatial light modulator material positioned in overlying relationship to the mirror so that light passing through the spatial light modulator material is reflected back through the spatial light modulator material;

a light polarizing layer positioned in overlying relationship to the array of reflective spatial light modulator pixels;

a light source mounted in an optically clear support positioned in overlying relationship to the array of reflective spatial light modulator pixels with the light source spaced from the array of reflective spatial light modulator pixels, so that light from the light source substantially evenly illuminates the array of reflective spatial light modulator pixels and allows passage of reflected light from the array of reflective spatial light modulator pixels through the optically clear support; and a diffuser mounted in overlying relationship to the optically clear support to form an image plane for reflected light from the array of reflective spatial light modulator pixels.

2. An integrated electro-optic package for reflective spatial light modulators as claimed in claim 1 wherein the optically clear support is optically clear plastic.

3. An integrated electro-optic package for reflective spatial light modulators as claimed in claim 2 wherein the optically clear plastic has a temperature coefficient of expansion that is substantially similar to the array of reflective spatial light modulator pixels temperature coefficient of expansion.

4. An integrated electro-optic package for reflective spatial light modulators as claimed in claim 1 wherein the optically clear support is molded optically clear plastic.

5. An integrated electro-optic package for reflective spatial light modulators as claimed in claim 1 wherein the light source includes a plurality of light emitting diodes.

6. An integrated electro-optic package for reflective spatial light modulators as claimed in claim 5 wherein the plurality of light emitting diodes includes at least two diode, each of which emit a different color of light.

7. An integrated electro-optic package for reflective spatial light modulators as claimed in claim 1 wherein the optically clear support includes a molded optically clear plastic and the light source is a plurality of light emitting diodes embedded in the optically clear plastic.

8. An integrated electro-optic package for reflective spatial light modulators as claimed in claim 1 where, in the array of reflective spatial light modulator pixels, the layer of spatial light modulator material is a continuous layer across the entire array and each control circuit for each pixel formed in the substrate includes one contact, the array further including an optically clear contact positioned on an opposite side of the continuous layer with the one contact and the optically clear contact defining a pixel within the continuous layer.

9. An integrated electro-optic package for reflective spatial light modulators as claimed in claim 8 wherein the spatial light modulator material includes liquid crystal material.

10. An integrated electro-optic package for reflective spatial light modulators as claimed in claim 8 wherein the liquid crystal material includes ferroelectric liquid crystal material.

11. An integrated electro-optic package for reflective spatial light modulators as claimed in claim 8 wherein the optically clear contact for each pixel is formed in a layer if indium-tin-oxide deposited in overlying relationship to the continuous layer of spatial light modulator material.

12. An integrated electro-optic package for reflective spatial light modulators as claimed in claim 8 wherein the mirror positioned on the substrate is a polished pad of metal, one for each pixel, which pad of metal also forms the one contact included in the control circuit.

13. An integrated electro-optic package for reflective spatial light modulators as claimed in claim 10 wherein the polished pad of metal for each pixel is a polished pad of aluminum.

14. An integrated electro-optic package for reflective spatial light modulators as claimed in claim 1 including in addition a housing having the light source and the optically clear support mounted therein, with the diffuser being removeably mounted and further mounted for axial movement toward and away from the optically clear support to provide focusing of images formed on the diffuser.

15. An integrated electro-optic package for reflective spatial light modulators as claimed in claim 1 including in addition a housing including leads formed therein so as to be in electrical contact with the control terminals adjacent an outer edge of the substrate of each control circuit and the leads further extend to an external portion of the housing to form external contacts for the control circuits.

16. An integrated electro-optic package for reflective spatial light modulators as claimed in claim 15 wherein the housing is molded and the leads are a leadframe molded into the housing.

17. An integrated electro-optic package for reflective liquid crystal spatial light modulators comprising:

a reflective liquid crystal spatial light modulator stack including a substrate with a plurality of control circuits formed therein, each control circuit including control terminals adjacent an outer edge of the substrate and an electrical contact mirror positioned on the substrate, each electrical contact mirror defining a pixel and a first electrical contact for the pixel, a layer of liquid crystal spatial light modulator material positioned in overlying relationship to the electrical contact mirrors so that light passing through the liquid crystal spatial light modulator material is reflected back through the liquid crystal spatial light modulator material, and an electrically conductive optically transparent layer of material positioned on an opposite surface of the liquid crystal spatial light modulator material to form a second electrical contact for each pixel;

a light polarizing layer positioned in overlying relationship to the electrically conductive optically transparent layer of material;

a light source mounted in an optically clear support positioned in overlying relationship to the reflective liquid crystal spatial light modulator stack with the light source spaced from the reflective liquid crystal spatial light modulator stack, so that light from the light source substantially evenly illuminates the reflective liquid crystal spatial light modulator stack and allows passage of reflected light from the reflective liquid crystal spatial light modulator stack through the optically clear support; and a diffuser mounted in overlying and spaced relationship to the optically clear support to form an image plane for reflected light from the reflective liquid crystal spatial light modulator stack.

18. An integrated electro-optic package for reflective liquid crystal spatial light modulators as claimed in claim 17 wherein the layer of liquid crystal spatial light modulator material is contained within a closed cavity having internal opposed flat surfaces, the electrical contact mirrors are affixed to one of the internal surfaces and the electrically conductive optically transparent layer is affixed to the other of the internal surfaces.

19. An integrated electro-optic package for reflective liquid crystal spatial light modulators as claimed in claim 18 wherein the closed cavity is defined by a surface of the substrate, a spacer affixed to the surface of the substrate and a glass plate affixed over the spacer.

20. An integrated electro-optic package for reflective liquid crystal spatial light modulators comprising:

a reflective liquid crystal spatial light modulator stack including a substrate with a plurality of control circuits formed therein, each control circuit including control terminals adjacent an outer edge of the substrate and an electrical contact mirror positioned on the substrate, each electrical contact mirror defining a pixel and a first electrical contact for the pixel, a layer of liquid crystal spatial light modulator material positioned in overlying relationship to the electrical contact mirrors so that light passing through the liquid crystal spatial light modulator material is reflected back through the liquid crystal spatial light modulator material, an electrically conductive optically transparent layer of material positioned on an opposite surface of the liquid crystal spatial light modulator material to form a second electrical contact for each pixel, and the layer of liquid crystal spatial light modulator material being contained within a closed cavity having internal opposed flat surfaces and defined by a surface of the substrate, a spacer affixed to the surface of the substrate and a glass plate affixed over the spacer with the electrical contact mirrors affixed to one of the internal surfaces and the electrically conductive optically transparent layer affixed to the other of the internal surfaces;

an optically clear support having defined therein a cavity formed to receive the reflective liquid crystal spatial light modulator stack in nesting engagement, the optically clear support further including a plurality of electrical leads each formed therein so as to provide a first contact in the cavity and a second contact at an external surface of the optically clear support;

a light polarizing layer positioned in the cavity of the optically clear support;

the reflective liquid crystal spatial light modulator stack being nestingly positioned in the cavity so that the polarizing layer is positioned in overlying relationship to the electrically conductive optically transparent layer of material;

a light source mounted in the optically clear support and positioned in overlying relationship to the reflective liquid crystal spatial light modulator stack with the light source spaced from the reflective liquid crystal spatial light modulator stack, so that light from the light source passes through the polarizing layer, substantially evenly illuminates the reflective liquid crystal spatial light modulator stack, and allows passage of reflected light from the reflective liquid crystal spatial light modulator stack through the polarizing layer and the optically clear support; and a diffuser mounted in overlying and spaced relationship to the optically clear support to form an image plane for reflected light from the reflective liquid crystal spatial light modulator stack which passes through the polarizing layer and the optically clear support.

21. A method of fabricating an integrated electro-optic package for reflective spatial light modulators comprising the steps of:

providing a stack including a plurality of reflective spatial light modulators formed in a two dimensional array on a semiconductor substrate with drive electronics formed in the substrate for each spatial light modulator of the array of spatial light modulators and control terminals for the drive electronics positioned adjacent outer edges of the substrate, the stack further including a light transparent surface defining a light input and light output for each of the spatial light modulators in the two dimensional array of reflective spatial light modulators;

forming an optically clear support having defined therein a cavity formed to receive the reflective spatial light modulator stack in nesting engagement with a lower surface of the cavity substantially parallel with and adjacent to the light transparent surface of the stack, the optically clear support further being formed to include a plurality of electrical leads each positioned therein so as to provide a first contact in the cavity and a second, electrically coupled contact at an external surface of the optically clear support;

providing a light polarizing layer and positioning the polarizing layer in the cavity of the optically clear support;

positioning the stack nestingly in the cavity so that the polarizing layer is positioned in overlying relationship and adjacent to the light transparent surface of the stack;

mounting a light source in the optically clear support and positioning the light source in overlying relationship to the light transparent surface of the stack with the light source spaced from the light transparent surface of the stack, so that light from the light source passes through the polarizing layer, substantially evenly illuminates the light transparent surface of the stack, and allows passage of reflected light from the light transparent surface of the stack through the polarizing layer and the optically clear support; and diffusing light reflected from the stack to form an image.

22. A method of fabricating an integrated electro-optic package for reflective spatial light modulators as claimed in claim 21 wherein the step of diffusing includes mounting a diffuser in overlying relationship to the optically clear support to form an image plane for light reflected from the stack and passing through the polarizing layer and the optically clear support.

23. A method of fabricating an integrated electro-optic package for reflective spatial light modulators as claimed in claim 21 wherein the step of forming an optically clear support includes molding the optically clear support from plastic.

24. A method of fabricating an integrated electro-optic package for reflective spatial light modulators as claimed in claim 23 wherein the step of molding the optically clear support from plastic includes a step of molding a leadframe into the plastic to form the plurality of electrical leads.

25. A method of fabricating an integrated electro-optic package for reflective spatial light modulators as claimed in claim 24 wherein the step of molding the optically clear support from plastic and the step of mounting a light source in the optically clear support include forming the optically clear support with a second surface spaced from the lower surface of the cavity and on a side opposite thereto and embedding at least one light emitting diode into the second surface.

* * * * *